United States Patent [15] 3,644,241
Falivene [45] Feb. 22, 1972

[54] ANTISOILING AEROSOL STARCH PREPARED FROM ETHOXYLATED STARCH AND A FLUOROACRYLATE OR FLUOROALPHA SUBSTITUTED ACRYLATE POLYMER

[72] Inventor: Pasquale Joseph Falivene, Union City, N.J.
[73] Assignee: Colgate-Palmolive Company, New York, N.Y.
[22] Filed: Mar. 11, 1970
[21] Appl. No.: 18,764

[52] U.S. Cl..................260/17.4 ST, 117/135.5, 117/139.4, 117/165, 252/8.9, 260/29.6 F, 260/86.1 R, 260/86.1 E
[51] Int. Cl. .............................................C08f 45/58
[58] Field of Search...................260/17.4 ST, 29.6 F, 86.1; 117/135.5

[56] References Cited

UNITED STATES PATENTS

| | | | |
|---|---|---|---|
| 2,461,139 | 2/1949 | Caldwell | 260/234 |
| 3,068,187 | 12/1962 | Bolstad et al. | 260/29.6 |
| 3,081,296 | 3/1963 | Smith et al. | 260/233.5 |
| 3,102,103 | 8/1963 | Ahlbrecht et al. | 260/29.6 |
| 3,282,905 | 11/1966 | Fasick et al. | 260/89.5 |
| 3,345,318 | 10/1967 | Lindemann et al. | 260/29.6 |
| 3,347,812 | 10/1967 | DeMarco et al. | 260/29.6 |
| 3,356,628 | 12/1967 | Smith et al. | 260/29.6 |
| 3,373,126 | 3/1968 | Lehrman et al. | 260/17.4 |
| 3,378,609 | 4/1968 | Fasick et al. | 260/890 |

Primary Examiner—William H. Short
Assistant Examiner—L. L. Lee
Attorney—Herbert S. Sylvester, Murray M. Grill, Norman Blumenkopf, Ronald S. Cornell, Thomas J. Corum, Richard N. Miller and Robert L. Stone

[57] ABSTRACT

Aerosol spray starch compositions containing fluoropolymer emulsion in alkaline aqueous medium stabilized by ethoxylated starch.

8 Claims, No Drawings

ANTISOILING AEROSOL STARCH PREPARED FROM ETHOXYLATED STARCH AND A FLUOROACRYLATE OR FLUOROALPHA SUBSTITUTED ACRYLATE POLYMER

The present invention relates to improved textile sizing compositions, particularly of the type normally used preparatory to ironing textiles.

The use of starch as a size and stiffening agent for textile materials is probably as old as textiles themselves. It is only within the last several decades that the housewife has been offered such a product in an already prepared liquid form for application to the textile before ironing. Such starching compositions are now available in a variety of forms and among the most popular is an aerosol-type formulation.

It is also known to add to aforesaid starch compositions, antisoiling agents which are both water and oil repellent so as to render the treated textile resistant to both water and oil borne stains.

It has now been found that the fluoropolymer emulsions are superior soil repellents but have the disadvantage of being unstable in alkali medium. Emulsifiers have been used to stabilize these emulsions but said emulsifiers have been found to detract from the ironing and repellency characteristics of the spray starch compositions.

Consequently, it has also been found that the use of ethoxylated starch stabilizes the fluoropolymer emulsion in alkali medium, thereby yielding a superior spray starch product, the starch performing the dual function of fabric stiffening and as a protective colloid. The presence of ethoxylated starch eliminates the need for emulsifiers, which has the advantages of undiminished soil repellency, reduction of scorching and sticking to soleplate, simplification of processing and reduction of material costs.

The preferred form of the compositions of this invention is a self-propelling liquid composition wherein the major carrier liquid is water and the propellent is a suitable low boiling hydrocarbon or halogenated hydrocarbon as exemplified by methylchloride, methylenechloride, isobutane and the various chlorinated fluorinated methanes, ethanes, and the like, such as dichloro difluoro methane and the like.

The aerosol composition of this invention may be dispensed from any type of container inclusive of plastic, glass, metal or combinations thereof. In the use of tin cans, which is the type of container most often used, it has been found that acid emulsions are intolerably corrosive. Consequently, the compositions of the present invention are required to have a pH of about 9.

The alkaline aqueous compositions of the present invention comprise as the essential ingredients thereof ethoxylated starch and a thermoplastic film-forming fluorocarbon polymer as hereinafter described.

The stiffening and protective colloid component is ethoxylated starch prepared by known ethoxylation processes such as reacting starch with an aliphatic alkylene oxide having from two to five carbon atoms. During the ethoxylation process, the average molecular weight of the starch product is degraded from about 200,000 to 30–50,000, thereby rendering the lower molecular weight starch more fluid in solution. The ethoxylated starch is an ether-type starch derivative containing about 0.05 to 0.08 mole ethylene oxide (when reacted with ethylene oxide) per mole of starch. Any starch may be ethoxylated inclusive of those derived from any vegetable source such as corn, wheat, tapioco, potato, waxy maise, etc. Starch derivatives such as dextrines, hydrolized and oxidized starches or other chemically treated starches which still retain their essentially amylaceous nature and possess a sufficient number of reactive hydroxyl groups to be able to react with the alkylene oxide in the ethoxylation process are also included. The ethoxylated starches are stable, homogenous, hydrated colloidal dispersions readily soluble in water. The viscosity of aforesaid thermoplastic starch products can be varied from very high (low fluidity) to very thin (high fluidity) depending on its desired use. For aerosol dispensing it is desirable to utilize a thin starch solution.

In addition to its sizing properties, ethoxylated starch functions as a protective colloid for the fluoropolymer. This is believed to be a function of the relatively large, hydrophilic molecules of the ethoxylated starch which remain in colloidal suspension and coat the fluoropolymer hydrophobic molecules to confer onto them a hydrophilic nature. This protective action maintains the fluoropolymer in suspension without the need for emulsifying agents.

The amount of starch material which may be employed in the compositions of this invention may be varied widely, but in general from about 1 to about 10 percent thereof based on the total weight of the aerosol formulation may be used. More important than the specific amount of the starch, is the ratio of the latter to the fluorocarbon polymer employed. In general the ratio of these two components may vary from about 3:1 to 100:1 (starch to fluoropolymer). The minimum ratio of starch to fluoropolymer emulsion containing 22 percent solids is 1.00:1.44 in order to obtain adequate stabilization of the fluoropolymer. By the use of the aforementioned ratios it has been found that an outstanding, protective and stiffening action is obtained which does not interfere with the provision of excellent soil resistance.

The fluoropolymer component of the compositions of this invention comprise a thermoplastic polymeric material in the form of an emulsion, known as a latex, which is characterized by the ability to dry to a continuous cohesive film. Fluoropolymers are well known but those which are preferred in the present invention comprise the general class of the perfluoro acrylates and alpha-substituted acrylates, such as methacrylates. If a low molecular weight fluoropolymer is preferred, such polymers are prepared from the corresponding monomers as listed above but include a chain transfer agent, e.g., alkanethiol, such as dodecyl mercaptan, to terminate the polymer. As illustrative of the fluoropolymers which may be used in the present invention, mention may be made of the following:

Homopolymers of 1H, 1H perfluorohexyl acrylate
1H, 1H perfluorocetyl acrylate
1H, 1H perfluorodecyl acrylate
1H, 1H perfluorododecyl acrylate
1H, 1H perfluorohexyl methacrylate
1H, 1H perfluorodecyl methacrylate
1H, 1H perfluorododecyl methacrylate
1H, 1H perfluorohexyl$\alpha$-fluoroacrylate
1H, 1H perfluorodecyl$\alpha$-fluoroacrylate
1H, 1H 7H perfluoroheptyl acrylate
1H, 1H, 11H perfluoroundecyl methacrylate
1H, 1H, 3H perfluoroacetyl acrylate
1H, 1H, 3H perfluoroacetyl$\alpha$-fluoroacrylate
1H, 1H perfluoroheptyl$\alpha$-chloroacrylate in the general formula of which may be presented as follows:

$$X_1(C(X)_2)_n(CH_2)_mO\underset{\underset{O}{\|}}{C}-\overset{\overset{X}{|}}{C}=CH_2$$

wherein $X_1$ is hydrogen, chlorine or fluorine; X is hydrogen, alkyl ($C_1$ to $C_8$) chlorine or fluorine, $n$ has a value of 3 to 30, $m$=1, 2 or 3. $X_2$ is hydrogen, lower alkyl ($C_1$ to $C_4$) or halogen and at least 70 percent but not less than 6 of the X's are fluorine; interpolymers (i.e., copolymers and terpolymers of the aforementioned monomers; with polymerizable vinyl compounds, said interpolymer containing at least 25 mole percent of fluoromonomer.

Suitable comonomers include:

vinyl esters of organic and inorganic acids, e.g., vinyl chloride; vinyl bromide; vinyl fluoride; vinyl acetate; vinyl propionate; vinyl stearate, vinyl benzoate;

vinyl ethers, e.g., methyl vinyl ether; ethyl vinyl ether; n-butyl vinyl ether; decyl vinyl ether; octa decyl vinyl ether; benzyl vinyl ether; phenyl vinyl ether; and divinyl ether;
alkyl vinyl ketones (alkyl $C_1$ to $C_{30}$)
alkyl acrylates (alkyl $C_1$ to $C_{30}$)
alkyl methacrylates (alkyl $C_1$ to $C_{30}$)
vinylidene halides
acrylic acid
acrylonitrile
acrylamide
N-methylol acrylamide; N-methoxy methyl acrylamide
styrene, alkyl styrenes
1,3-butadiene
alkyl esters
alkyl halides
mono- and di-acrylate esters of alkanediols
mono- and di-vinyl esters of alkanedioic acids and the like.

Specific copolymers, terpolymers and interpolymers of particularly outstanding characteristics include the following monomers: (weight basis)

I. (a) 95% $CF_3(CF_2)_5CH_2CH_2OC(=O)-C(CH_3)=CH_2$
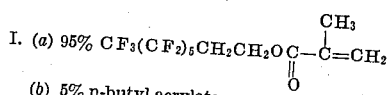
   (b) 5% n-butyl acrylate II. (a) 97.5% $CF_3(CF_2)_5CH_2CH_2OC(=O)-C(CH_3)=CH_2$
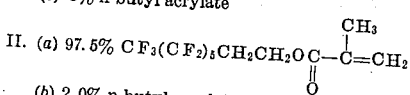
   (b) 2.0% n-butyl acrylate
   (c) 0.5% N-methylol acrylamide III. (a) 50% $CF_3(CF_2)_5CH_2CH_2OC(=O)-C(CH_3)=CH_2$
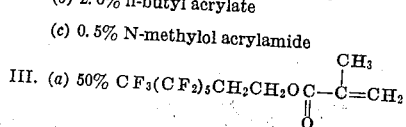
   (b) 50% 2-ethylhexyl methacrylate IV. (a) 25% $CF_3(CF_2)_5CH_2CH_2OC(=O)-C(CH_3)=CH_2$
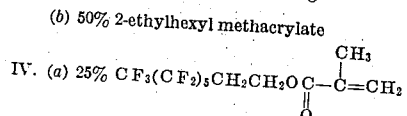
   (b) 70% 2-ethylhexyl methacrylate
   (c) 5% N-methylol acrylamide V. (a) 80% $CHF_2(CF_2)_5CH_2OC(=O)-C(CH_3)=CH_2$
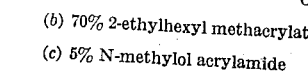
   (b) 5% n-butyl acrylate
   (c) 10% 2-ethylhexyl methacrylate
   (d) 5% n-butyl methacrylate VI. (a) 98% $CHF_2(CF_2)_7CH_2OC(=O)-CH=CH_2$
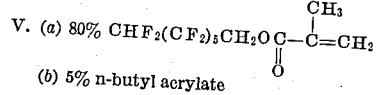
   (b) 2% 2-ethyl hexylacrylate VII. (a) 97.5% $CF_3(CF_2)_5CH_2CH_2OC(=O)-C(F)=CH_2$
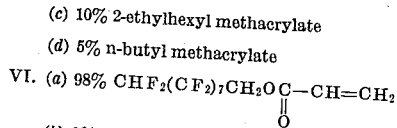
   (b) 2% n-butyl acrylate
   (c) 0.5% N-methylol acrylamide VIII. (a) 98% $CF_3(CF_2)_5CH_2CH_2OC(=O)-C(CH_3)=CH_2$
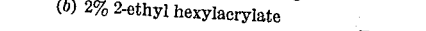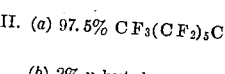
   (b) 2% n-butyl acrylate IX. (a) 48.8% $CF_3(CF_2)_5CH_2CH_2OOC-C(CH_3)=CH_2$
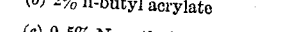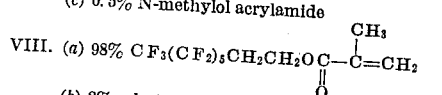
   (b) 32.5% $CF_3(CF_2)_7CH_2CH_2OOC-C(CH_3)=CH_2$
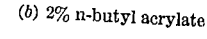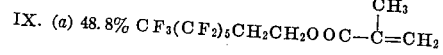
   (c) 16.2% $CF_3(CF_2)_9CH_2CH_2OOC-C(CH_3)=CH_2$
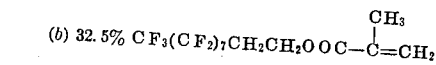
   (d) 2% n-butyl acrylate
   (e) 0.5% N-methylol acrylamide In lieu of the fluorohomopolymer or interpolymers described above, low molecular weight fluorohomopolymers and fluorointerpolymers may be utilized. These are prepared by emulsion polymerization in the presence of minor amounts of chain transfer agents. A typical low molecular weight product is prepared from the following: (polymerization run at 70° C. for 5 hours).

X.

95 parts $CF_3(CF_2)_5CH_2CH_2OC(=O)-C(CH_3)=CH_2$
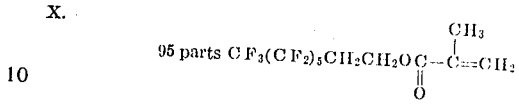

2 parts N-butyl acrylate
2 parts octadecyl dimethylamine acetate
1.2 parts dodecyl mercaptan
200 parts water The polymer produced by this technique is of much lower molecular weight than that normally prepared in the absence of the chain transfer agent, dodecyl mercaptan.

The formulations of the present invention may be used in any convenient concentration in a bath spray, roller padder or aerosol method of application. Generally, concentrations are selected to give a solid pickup based on the material treated of between 0.1 to 10 percent by weight. Since in order to obtain uniform treatment of a textile, it is desirable to have from about 1 to 200 percent, and preferably from about 25 to 100 percent, wet pickup, the concentrations of active components in the treating composition for the preferred pickup will vary from about 40 down to 0.1 percent. Clearly, such concentrations are not critical and are subject to the wide variation and great latitude indicated above.

In the preferred and most convenient method of application by the consumer of the composition of this invention, i.e., aerosol method, the aqueous compositions are formulated with a suitable propellant. These include trichloromonofluoromethane, dichlorotetrafluoroethane, dichloromonofluoromethane, monochlorotrifluoromethane, isobutane, difluoroethane, n-butane, propane, 1,1,1-difluorochloroethane, 1,1,1-cyclobutane, carbon dioxide, nitrous oxide.

In general, the propellants are water-immiscible or only slightly soluble in water with vapor pressures at 70° F. of from about 0.2 to about 500 p.s.i.g. The selection of a suitable propellant or mixture of propellants will, of course, depend on the type of package to be used, the specific nature of the composition to be dispensed, and the spray pattern desired, among others. Where lower pressures are to be maintained in the package it may be desirable to use a propellant of slight water solubility to aid in dispensing the product after it leaves the nozzle.

The preferred propellants are the low-density compounds and mixtures of low density which form a separate and upper liquid phase in the aerosol package providing thereby a separate phase system. While it is not intended to foreclose the use of higher density propellants (i.e., higher than the aqueous latex phase) in which case the propellant will be on the bottom in the aerosol package, this is not preferred because of the inadequacies of the mechanics of the package required for dispensing such compositions and further because other means for making such systems workable (i.e., shortened dip tube) create undesirable economic factors (e.g., cannot discharge a high percent of the active ingredients). In order to achieve the benefits of this invention, however, any technique aerosol or otherwise may be employed notwithstanding the fact that the optimum results may be obtained with certain specific formulations and techniques and these might, in general, be preferred especially by the housewife.

The amount of propellant as well as the specific one or ones used will vary depending upon the pressure limitations on the package and the spray pattern desired. Generally from 5 to 25 percent by weight of propellant circumscribes the practical range thereof, and as pointed out above, among these the low-density, medium vapor pressure hydrocarbons such as isobutane are preferred.

In addition to the ethoxylated starch and fluoropolymer there may also be present in the compositions of this invention many other additives which do not adversely affect the attainment of stiffening and antisoiling (water and oil repellency). Examples of such additional materials may include antistick agents such as the siloxane resins, polyethylene and the like; additional water repellent materials such as long chain fatty quaternary ammonium compounds; antioxidants; antifoamers; bactericides; surface active agents; coloring materials, perfumes; textile fiber-reactive chemicals, e.g. formaldehyde, glyoxal; crease resistant and crease-proofing agents, and the like.

The following examples serve to illustrate the present invention without being deemed limitative thereof. Parts are by weight unless otherwise indicated.

EXAMPLE I

Aerosol Spray Starch

| Ingredients | % by Weight |
| --- | --- |
| Ethoxylated corn starch (0.05–0.08 moles ethylene oxide per mole of starch, pH 7.0, 12% moisture, scott viscosity of 55 (75g.)) | 4.0 |
| Terpolymer of 1H, 1H, 2H, 2H tridecafluorooctyl methacrylate (97.5%), n-butyl acrylate (2%) and N-methylol acrylamide (0.5%) | 1.08 |
| Low molecular weight copolymer of 1H, 1H, 2H, 2H tridecafluorooctyl methacrylate (97%) and n-butyl acrylate (2%) reacted in presence of dodecyl mercaptan | 0.36 |
| Water, deionized | 94.33 |
| Concentrated Ammonia | 0.04 |
| Ironing aid | 0.05 |
| Formalin | 0.04 |
| Sodium Benzoate | 0.10 |
| Perfume | 0.002 |

The starch is cooked up as a 10 percent solution. The remaining formula water is added, followed by the formalin, perfume and lastly the fluoropolymers. Concentrated ammonia is then added slowly to adjust the pH to 9.0±0.1. The ironing aid is added followed by the sodium benzoate.

A sample of cotton fabric is immersed in the above aqueous composition squeezed to 50 percent pickup, air dried until slightly damp and ironed at 400° F. to dryness. The resultant fabric exhibits good water- and oil-repellency and has a crisp handle characteristic of a starched material.

EXAMPLE II

Ninety-three percent of the alkaline aqueous formulation of Example I was mixed with 7 percent isobutane propellant and packaged in a tin can. There was no evidence of corrosion or settling of component ingredients even after 5 days of standing at room temperature.

EXAMPLE III

Aerosol Spray Fabric Size

| Ingredients | % by Weight |
| --- | --- |
| Ethoxylated Corn Starch (same as Ex. I) | 1.0 |
| Terpolymer of Ex. I | 1.08 |
| Copolymer of Ex. I | 0.36 |
| Water, deionized | 97.33 |
| Concentrated ammonia | 0.04 |
| Ironing aid | 0.05 |
| Formalin | 0.04 |
| Sodium Benzoate | 0.10 |
| Perfume | 0.002 |

A 10 percent starch solution was cooked up. The rest of the water was added followed by the other ingredients. The ammonia was added to adjust the pH to 9.1±0.1.

EXAMPLE IV

| Ingredients | Weight in grams |
| --- | --- |
| Fluoropolymers (same as Ex. I) | 14.4 g. |
| Water | 885.6 |
| Ethoxylated starch (10% solution) (same as Ex. I) | 100.0 |
| Concentrated ammonia | 0.4 |
| pH | 9.1 |

No precipitate nor change in pH was noted after standing at room temperature for 5 days.

EXAMPLE V

Example IV is repeated wherein the propellant and amount thereof is varied as follows: (with a corresponding change in % water)

| | |
| --- | --- |
| Isobutane | 5% |
| Isobutane | 10% |
| Isobutane | 20% |
| n-butane | 8% |
| Freon 12 | 6% |
| methyl chloride | 4% |
| hexafluoroethane | 3% |
| nitrous oxide | 6% |
| 4:1 mixture of isobutane and Freon 12 | 6% |

Excellent results are obtained.

As the above examples illustrate, the compositions of this invention produce excellent sizing along with unique water- and oil-repellency on textiles. The compositions may be applied to the textiles in any convenient manner although they are most superior when used in an aerosol form. Where the propellant in these compositions is more dense than the aqueous components, the package structure will, obviously, vary from those packages or container used with propellants which are less dense than and form an upper discrete liquid phase. Regardless of these variations, however, excellent properties are forthcoming in all instances.

Many substances may be added to the compositions of this invention, as pointed out above, and as will be obvious to one skilled in the art, the parameters are extremely varied, particularly in view of the fact that none of the additives need be soluble either in water or the selected propellant. Where it is desired, a compound may be added as a solution in a suitable solvent and such solution added to the aqueous compositions producing in most instances a dispersion of the said compound in the compositions. Many other variations will be apparent and it is clear that these may be resorted to without departing from the spirit and scope of this invention and that the specific embodiments set out herein are in no way limitative thereof.

What is claimed is:

1. A stable, antisoiling aqueous textile-treating composition comprising
   a. ethoxylated starch having a molecular weight of from 30,000 to 50,000 and containing from 0.05 to 0.08 mole of ethylene oxide, and
   b. a thermoplastic the ratio of the solids of (a) to (b) ranging from 3:1 to 100:1.

2. A composition as defined in claim 1, including a propellant, whereby said composition is rendered self-propellant.

3. A composition as defined in claim 2, wherein said propellant is a low-boiling material selected from the group consisting of hydrocarbons, halogenated hydrocarbons and mixtures thereof.

4. A composition as defined in claim 3, wherein the propellant constitutes about 5 to 25 percent by weight of the composition.

5. A composition as defined in claim 4, wherein the ethoxylated starch constitutes about 1 to 10 percent by weight of the total composition.

6. A composition as defined in claim 1, wherein the ratio of starch to fluoropolymer component is 3:1.

7. A composition as defined in claim 4 wherein the amount of ethoxylated starch is 4 percent, the amount of perfluoro polymer is 1 percent and the propellant is isobutane.

8. A composition as defined in claim 7 wherein the perfluoro polymer is a terpolymer.

* * * * *